(12) United States Patent
Budzisch et al.

(10) Patent No.: US 7,734,763 B2
(45) Date of Patent: Jun. 8, 2010

(54) APPLICATION FOR TESTING THE AVAILABILITY OF SOFTWARE COMPONENTS

(75) Inventors: Janko Budzisch, Reilingen (DE); Pavel Kojevnikov, Rauenberg (DE); Stephen Pfeiffer, Schriesheim (DE)

(73) Assignee: SAP AG, Walldorf (DE)

( * ) Notice: Subject to any disclaimer, the term of this patent is extended or adjusted under 35 U.S.C. 154(b) by 415 days.

(21) Appl. No.: 10/749,854

(22) Filed: Dec. 30, 2003

(65) Prior Publication Data

US 2007/0299962 A1    Dec. 27, 2007

Related U.S. Application Data

(60) Provisional application No. 60/513,942, filed on Oct. 24, 2003.

(51) Int. Cl.
*G06F 15/173* (2006.01)
(52) U.S. Cl. ........................ 709/224; 709/223
(58) Field of Classification Search ......... 709/223–225, 709/200, 203; 702/108
See application file for complete search history.

(56) References Cited

U.S. PATENT DOCUMENTS

| | | | |
|---|---|---|---|
| 6,061,723 A | 5/2000 | Walker et al. | |
| 6,070,190 A * | 5/2000 | Reps et al. | 709/224 |
| 6,446,028 B1 | 9/2002 | Wang | |
| 6,470,388 B1 | 10/2002 | Niemi et al. | |
| 6,477,483 B1 * | 11/2002 | Scarlat et al. | 702/186 |
| 6,522,995 B1 * | 2/2003 | Conti et al. | 702/186 |
| 6,735,200 B1 | 5/2004 | Novaes | |

(Continued)

FOREIGN PATENT DOCUMENTS

JP    2000040021    2/2000

(Continued)

OTHER PUBLICATIONS

Janko Budzisch, "Graphical User Interface (GUI) for Displaying Software Component Availability As Determined by a Messaging Infrastructure", U.S. Appl. No. 10/749,769, filed Dec. 30, 2003, Office Action mailed Mar. 5, 2007. Office Action, claims prior to mailing of Office Action and the claims as they were presented to the PTO in response to the Office Action.

(Continued)

*Primary Examiner*—Faruk Hamza
(74) *Attorney, Agent, or Firm*—Schwegman, Lundberg & Woessner, P.A.

(57) ABSTRACT

An Information Systems (IS) monitoring approach is described that is capable of monitoring and displaying the availability of various software components, including "foundational" operation features of the IS infrastructure. A further capability is that the availability of the individual software components upon which a specific business logic process depends may each be individually and continuously checked, in a combined fashion that is referenced to the specific business logic process, so that the status of the business logic process itself (e.g., operable or non-operable) can be continuously determined. Moreover, operability or non-operability can be established over a wide range of different business logic processes on a process by process basis. In this manner, an IS administrator can keep abreast of the status of the IS infrastructure and its ability to execute business logic processes dependent on lower level software.

30 Claims, 11 Drawing Sheets

U.S. PATENT DOCUMENTS

| | | | |
|---|---|---|---|
| 6,842,891 B2 * | 1/2005 | Zhang et al. | 717/101 |
| 6,898,556 B2 | 5/2005 | Smocha et al. | |
| 6,973,627 B1 * | 12/2005 | Appling | 715/781 |
| 6,981,180 B1 | 12/2005 | Bailey et al. | |
| 6,983,317 B1 | 1/2006 | Bishop et al. | |
| 7,043,549 B2 | 5/2006 | Breese et al. | |
| 7,092,985 B2 | 8/2006 | Hubbard | |
| 7,099,797 B1 | 8/2006 | Richard | |
| 7,099,816 B2 | 8/2006 | Ignatowski et al. | |
| 7,099,938 B2 | 8/2006 | Hermann et al. | |
| 7,133,908 B1 | 11/2006 | Pajak et al. | |
| 7,146,305 B2 | 12/2006 | van der Made | |
| 7,162,516 B2 | 1/2007 | Hashimoto et al. | |
| 7,197,559 B2 | 3/2007 | Goldstein et al. | |
| 7,401,143 B2 | 7/2008 | Oulu, Yossi, et al. | |
| 7,406,627 B2 | 7/2008 | Bailey et al. | |
| 7,617,462 B2 | 11/2009 | Budzisch et al. | |
| 2002/0113816 A1 | 8/2002 | Mitchell et al. | |
| 2002/0169870 A1 | 11/2002 | Vosseler et al. | |
| 2002/0186238 A1 | 12/2002 | Sylor et al. | |
| 2003/0023336 A1 * | 1/2003 | Kreidler et al. | 700/108 |
| 2003/0056173 A1 * | 3/2003 | Copenhaver et al. | 715/513 |
| 2003/0225876 A1 | 12/2003 | Oliver et al. | |
| 2004/0139194 A1 * | 7/2004 | Naganathan | 709/224 |
| 2004/0267691 A1 | 12/2004 | Vasudeva | |
| 2008/0072178 A1 | 3/2008 | Budzisch | |

FOREIGN PATENT DOCUMENTS

| | | |
|---|---|---|
| JP | 2001005793 | 1/2001 |

OTHER PUBLICATIONS

Budzisch, Janko , et al., "Graphical User Interface (GUI) for displaying software component availability as determined by a Messaging Infrastructure", Janko Budzisch, et al., "*Graphical User Interface (GUI) for displaying software component availability as determined by a Messaging Infrastructure*", U.S. Appl. No. 10/749,769, filed Dec. 30, 2003. Office Action mailed Aug. 30, 2007. The Office Action, 18 pages.

Budzisch, Janko , et al., "Graphical User Interface (GUI) for displaying software component availability as determined by a Messaging Infrastructure", Janko Budzisch, et al., "*Graphical User Interface (GUI) for displaying software component availability as determined by a Messaging Infrastructure*", U.S. Appl. No. 10/749,769, filed Dec. 30, 2003. Office Action mailed Jan. 17, 2008. The Office Action, 23 pages.

Budzisch, Janko , et al., "Infrastructure for Maintaining Cognizance of Available and Unavailable Software Components", Janko Budzisch, et al., "*Infrastructure for Maintaining Cognizance of Available and Unavailable Software Components*", U.S. Appl. No. 10/750,036, filed Dec. 30, 2003. Office Action mailed Feb. 7, 2008. The Office Action, 24 pages.

Budzisch, Janko, et al., "User Interface (GUI) Displaying Software Component Availability As Determined by a Messaging Infrastructure", U.S. Appl. No. 10/749,769, filed Dec. 30, 2003. Office Action mailed Aug. 1, 2008, 14 pages.

Budzisch, Janko, et al., "Infrastructure for Maintaining Cognizance of Available and Unavailable Software Components", U.S. Appl. No. 10/750,036, filed Dec. 30, 2003. Office Action mailed Jul. 24, 2008, 9 pages.

Pras, A , "On the Difference between Information Models and Data Models", Networking Group, The Internet Society 2003, (Jan. 8, 2003), 1-8.

Office Action from U.S. Appl. No. 10/749,769, mailed Jan. 23, 2009, 12 pgs.

Office Action from U.S. Appl. No. 10/750,036, mailed Oct. 17, 2008, 8 pgs.

"U.S. Appl. No. 10/749,769, Advisory Action mailed Oct. 14, 2008", 4 pgs.

"U.S. Appl. No. 10/749,769, Final Office Action mailed Aug. 1, 2008", 12 pgs.

"U.S. Appl. No. 10/749,769, Final Office Action mailed Aug. 30, 2007", 19 pgs.

"U.S. Appl. No. 10/749,769, Non Final Office Action mailed Jan. 17, 2008", 22 pgs.

"U.S. Appl. No. 10/749,769, Non Final Office Action mailed Jan. 23, 2009", 18 pgs.

"U.S. Appl. No. 10/749,769, Non Final Office Action mailed Mar. 5, 2007", 20 pgs.

"U.S. Appl. No. 10/749,769, Notice of Allowance mailed Jun. 29, 2009", 9 pgs.

"U.S. Appl. No. 10/749,769, Response filed Mar. 31, 2009 to Non Final Office Action mailed Jan. 23, 2009", 9 pgs.

"U.S. Appl. No. 10/749,769, Response filed Apr. 21, 2008 to Non Final Office Action mailed Jan. 17, 2008", 17 pgs.

"U.S. Appl. No. 10/749,769, Response filed Jul. 9, 2007 to Non Final Office Action mailed Mar. 5, 2007", 17 pgs.

"U.S. Appl. No. 10/749,769, Response filed Sep. 30, 2008 to Final Office Action mailed Aug. 1, 2008", 12 pgs.

"U.S. Appl. No. 10/749,769, Response filed Nov. 30, 2007 to Final Office Action mailed Aug. 30, 2007", 15 pgs.

"U.S. Appl. No. 10/749,769, Response filed Dec. 1, 2008 to Advisory Action mailed Oct. 14, 2008", 14 pgs.

"U.S. Appl. No. 10/750,036 , Final Office Action mailed Jan. 6, 2010", 11 Pgs.

"U.S. Appl. No. 10/750,036, Final Office Action mailed Jul. 24, 2008", 8 pgs.

"U.S. Appl. No. 10/750,036, Final Office Action mailed Oct. 1, 2008", 8 pgs.

"U.S. Appl. No. 10/750,036, Non Final Office Action mailed Feb. 7, 2008", 10 pgs.

"U.S. Appl. No. 10/750,036, Non Final Office Action mailed Apr. 6, 2009", 3 pgs.

"U.S. Appl. No. 10/750,036, Response filed Jan. 20, 2009 to Final Office Action mailed Oct. 17, 2008", 10 pgs.

"U.S. Appl. No. 10/750,036, Response filed May 2, 2008 to Non Final Office Action mailed Feb. 7, 2008", 20 pgs.

"U.S. Appl. No. 10/750,036, Response filed Jul. 28, 2009 to Non Final Office Action mailed Apr. 6, 2009", 13 pgs.

"U.S. Appl. No. 10/750,036, Response filed Sep. 24, 2008 to Final Office Action mailed Jul. 24, 2008", 11 pgs.

"Method for Improving Network Availability with Redundant Network Servers", *IBM Technical Disclosure Bulletin*, vol. 39, No. 8, (Aug. 1996), 195-196 Pages.

* cited by examiner

APPLICATION FOR TESTING THE AVAILABILITY OF SOFTWARE COMPONENTS

CLAIM OF PRIORITY

The present application hereby claims the benefit of the filing date of a related Provisional Application filed on Oct. 24, 2003, and assigned Application Ser. No. 60/513,942.

FIELD OF INVENTION

The field of invention relates generally to Information Systems (IS); and, more specifically, to an application for testing the availability of software components.

BACKGROUND

The information systems (IS) of an enterprise are often responsible for performing the enterprise's database and business logic functions. Database functions involve the management or usage of the enterprise's records (such as accounting records, sales records, billing records, employee records, etc.). Business logic functions are underlying processes of the enterprise that have been reduced to automated execution (e.g., automatically calculating revenues, automatically scheduling services, etc.). Often, a business logic function depends upon the use of a database function (e.g., an automated billing system that invokes the customer order records of the enterprise). Moreover, database application software is often supplied with its own "business logic" software that enables business logic processes that invoke the core database function to be executed.

In modern day enterprises, a complicated infrastructure of inter-networked computing systems and their corresponding software are typically orchestrated to perform, as a cooperative whole, the database and business logic tasks of the enterprise. An exemplary arrangement is depicted in FIG. 1. FIG. 1 shows a network 101, which may be viewed as an enterprise's internal intranet or the Internet (or some combination thereof), to which an application server platform 102-103 and a Java based platform 104-108 are communicatively coupled. Through the immediately following discussion of each of these various functional elements 102-108 and some of their possible inter-relationships amongst each other, techniques employed by IS personnel in building the IS infrastructure of an enterprise should be better appreciated.

An application server 102 is often used to host a variety of applications (such as application 103). Business logic application software and/or database application software are frequent types of application software that are hosted by an application server 102. Here, "hosting" generally means being responsible for interpreting and/or formatting messages received/sent to network 101 so that the application 103 is properly used by the enterprise. For example, in a basic case where application 103 is a business logic application, the application server 102 responds to a request from the network 101 for application 103 (i.e., a request from some entity that has expressed a need for application 103 through network 101) by properly invoking application 103 in response to the request; and, forwards the result(s) of the application's execution to the requestor.

In other instances the application server 102 may perform additional business logic/database functionality "on top of" basic functionality provided by application 103 (e.g., so as to precisely respond to the request that was received from the network 101). The additional business logic/database functionality may involve the invocation of other application software. In further instances the application server 102 may physically assist in the downloading of executable application software to a requester. Many application servers are responsible for overseeing a plurality of different application software platforms. Moreover, one or more computing systems may be used to perform the application server 102 function. These same one or more computing systems may also be used (depending on implementation preference) to execute one or more of the hosted applications themselves.

Functional elements 104-108 depict a web server 104 and its corresponding Java based "back-end" functionality 105-108. The term "web server" 104 is largely understood to mean being capable of presenting a web based interface (e.g., through the downloading of web pages scripted in HTML (Hyper Text Markup Language) format) over a network 101. Accesses to specific web pages associated with the web based presentation are typically formatted in the HTTP (Hyper Text Transfer Protocol) protocol. Often, useful tasks that are dependent on business logic and/or database functions are made accessible through a web based presentation. FIG. 1 suggests such an approach by way of the back end JSP (Java Server Page) servlet engine 105, database (DB) 106 and Enterprise Java Beans (EJB) 107 applications, and J2EE (Java Platform, Enterprise Edition) server 108.

A servlet is a body of software typically geared to perform a specific database and/or business logic function (or at least oversee the execution of a specific database and/or business logic function). A servlet engine 105 is an entity capable of supporting the execution of a plurality of servlets and is the "target" for requests that invoke its constituent servlets. The architecture of FIG. 1 suggests that one or more of the various servlets supported by the servlet engine 105 depend upon separately packaged: 1) database software 106; 2) business logic software implemented with Enterprise Java Beans 107; and, 3) database and/or business logic software made accessible in a Java environment through a J2EE server 108.

The servlet engine 105 can also be used to generate web page matter that is forwarded to a user over the network by the web server 104. "Java Server Pages" (JSPs) are web pages having extended embedded software routines (which are often used for displaying dynamic content on a web page). The notion that the servlet engine 105 is a JSP servlet engine indicates that the servlet engine 105 of FIG. 1 is capable of providing JSP type web pages.

Enterprise Java Beans is a Java based application software development environment that produces software routines having a proficiency at being run in a distributed fashion (i.e., across multiple computing systems). Here, EJB 107 and 108 would be understood to correspond to a collection of programs (e.g., business logic programs) written with EJB. J2EE is a Java software platform for building applications that can be executed in a distributed fashion. EJB is a component of J2EE along with Java Server Pages (JSPs) and a variety of interfaces.

J2EE servers are servers retrofitted with J2EE software and are largely used as "middleware" servers that allow legacy, non Java applications to be made accessible and useable in a Java based environment. For example, the J2EE server associated with EJB 108 may be communicatively coupled to older non Java software that is still used to execute specific database and/or business logic routines. In this case, the J2EE server would be responsible for putting a "Java face" to the legacy software from the perspective of the servlet engine 105 (e.g., by accepting Java commands and interpreting them into an format understandable to a legacy routine).

Note that programs associated with EJB 107 and database (DB) 106 are configured to be accessible through a Java Native Interface (JNI) while programs associated with EJB 108 are configured to be accessible through one or more of the native interfaces associated with J2EE. JNI is a programming interface that may be used for function calls such as the functions/programs implemented in database 106 and EJB 107.

The exemplary IS infrastructure of FIG. 1 also shows an HTTP server 118 communicatively coupled to a J2EE server 119. An HTTP server is a server that can respond to requests from a network authored in the HTTP protocol (which is the primary web page identification protocol—thus, HTTP server 118 can also be viewed as a web server). The HTTP server 119 is communicatively coupled to a J2EE server 119.

Many business logic processes require a number of different software components to be invoked in a specific sequence. For example, an automated billing process might first run a database application to check the customer order records of the enterprise and then run an automated scripting application to create a custom tailored invoice for each order. Many business logic processes invoke a significant number of different software components over the course of their execution.

An issue with enterprise information systems is the ability to continuously monitor the specific software components that are used by a particular business logic process. If a particular software component becomes unavailable (for whatever reason) so as to render a business logic process unworkable, the existence of the "problem" may not be known until after the next attempt to use the process after the component became unavailable. This represents an efficiency loss in cases where the "problem" could have been fixed (or at least routed around) during the time period that elapsed from the moment the component became unavailable to the next attempt to run the process.

FIGURES

The present invention is illustrated by way of example and not limitation in the figures of the accompanying drawings, in which like references indicate similar elements and in which:

FIG. 6b shows a methodology for the monitoring of a component in scenario as initially depicted in FIG. 4a;

SUMMARY

An IS monitoring approach is described that is capable of monitoring the availability of various software components. A further capability is that the availability of the individual software components upon which a specific business logic process depends may each be individually and repeatedly checked, in a combined fashion that is referenced to the specific business logic process, so that the status of the business logic process itself (e.g., operable or non-operable) can be continuously determined on an on-going basis. Moreover, operability or non-operability can be established over a wide range of different business logic processes on a process by process basis.

In this manner, an IS administrator can keep abreast of the status of the IS infrastructure from a perspective that reflects an important purpose of the IS infrastructure: to execute business logic processes that depend upon lower level software components. In various embodiments, the results of the monitoring may be continuously updated and displayed in a display so that an IS administrator can visually ascertain the status of the enterprise's various business logic processes. The monitoring approach may also be capable of performing technical monitoring in which "foundational" operational features of the IS infrastructure (e.g., a JNI interface) are checked without reference to any particular business logic process.

DETAILED DESCRIPTION

An IS monitoring approach is described that is capable of monitoring the availability of various software components. A further capability is that the availability of the individual software components upon which a specific business logic process depends may each be individually and continuously checked, in a combined fashion that is referenced to the specific business logic process, so that the status of the business logic process itself (e.g., operable or non-operable) can be continuously determined on an on-going basis. Moreover, operability or non-operability can be established over a wide range of different business logic processes on a process by process basis.

In this manner, an IS administrator can keep abreast of the status of the IS infrastructure from a perspective that reflects an important purpose of the IS infrastructure: to execute business logic processes that depend upon lower level software components. In various embodiments, the results of the monitoring may be continuously updated and displayed in a display so that an IS administrator can visually ascertain the status of the enterprise's various business logic processes. The monitoring approach may also be capable of performing technical monitoring in which "foundational" operational features of the IS infrastructure (e.g., a JNI interface) are checked without reference to any particular business logic process.

Overview

Figure 1:
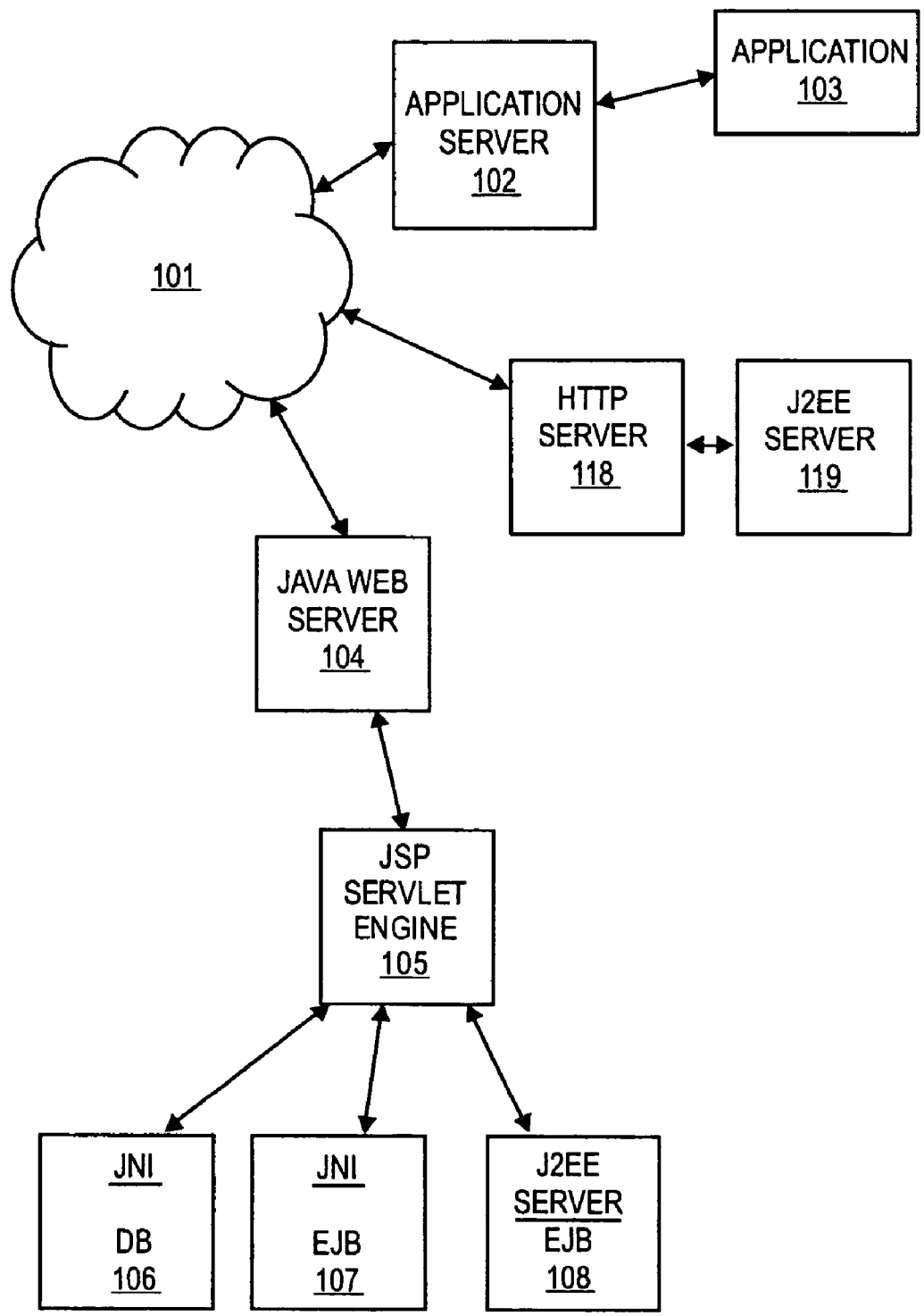
FIG. 1 shows components of an exemplary enterprise information system.
Figure 2:
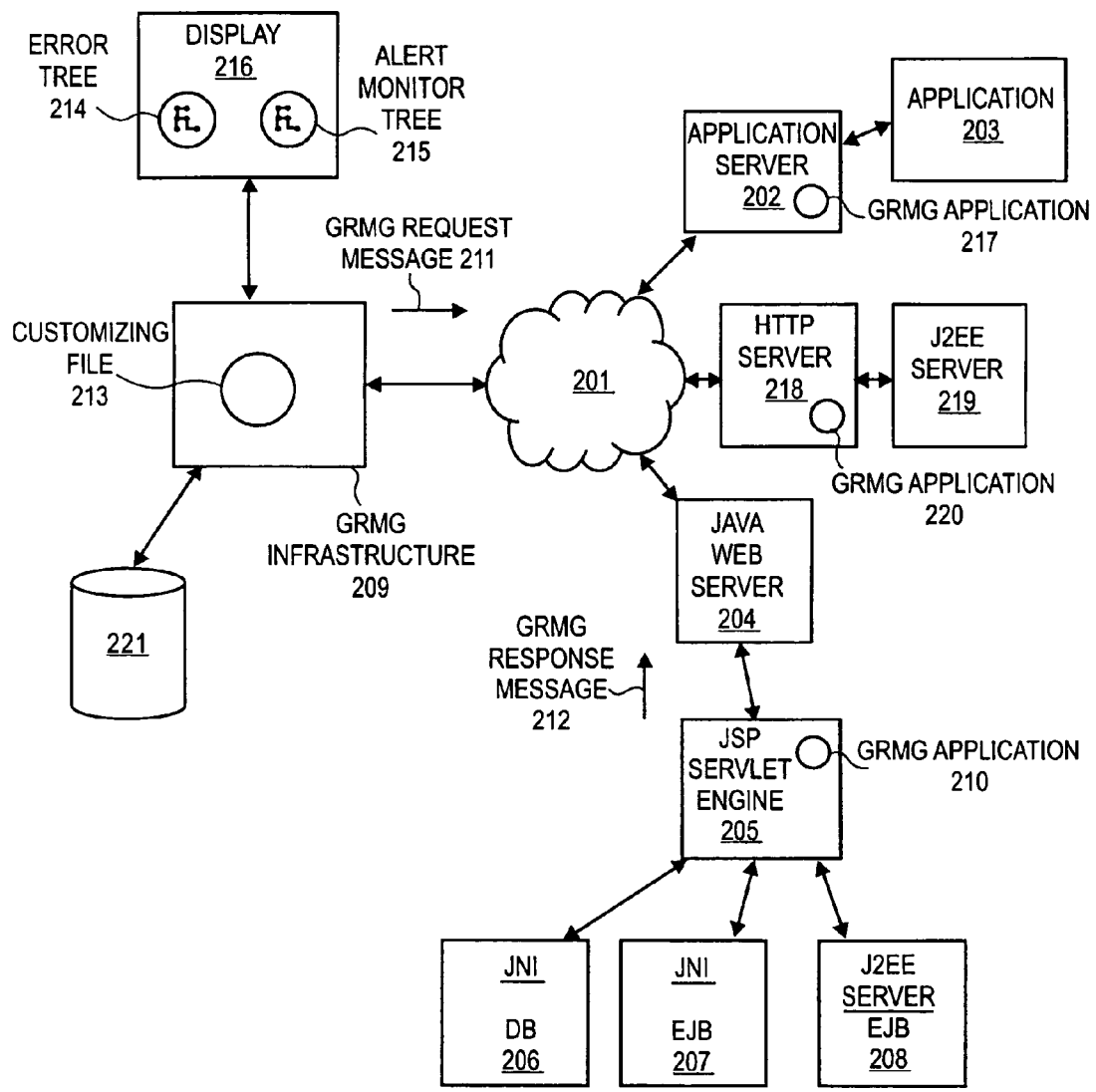
FIG. 2 shows an Information Systems (IS) monitoring approach capable of monitoring the availability of different software applications.

The monitoring approach of FIG. 2 is an exemplary depiction that applies software monitoring techniques to the particular IS arrangement originally depicted in FIG. 1. According to the monitoring techniques depicted in FIG. 2, a Generic Request Message Generation (GRMG) infrastructure unit 209 is responsible for repeatedly sending a GRMG request message 211 (hereinafter, "request message") to a GRMG application 210. The request message 211 identifies the various software components of a higher level "scenario". For example, in a typical implementation, the "scenario" might correspond to a business logic process that invokes a number of lower level software components (i.e., any one or more of: processes, programs, web pages); and, the request message 211 for the scenario identifies each of these components.

The GRMG application 210 is a unit of software that is designed to receive the request message 211 and "check into" the availability of each of the software components that are identified by the request message 211. The results of the inquiries into the software components are collected and placed into a GRMG response message 212 (hereinafter "response message"). For example, a functional disposition (e.g., "OKAY" or "ERROR") for each of the scenario's software components is included in the response message 212.

In a typical situation the GRMG application 210 is installed at a location where a plurality of business logic processes are overseen, managed and/or executed. In the exemplary depiction of FIG. 2, note that GRMG application 210 is installed with the servlet engine 205. As discussed in the background, a servlet engine 205 is an entity that is capable of supporting the execution of a plurality of servlets. As servlets are often used to perform business logic processes (which may or may not involve the preparation of web pages), the platform used to implement servlet engine 205 is also an appropriate location for a GRMG application 210 that is configured to test the availability of the software components that the servlets supported by servlet engine 205 depend upon. For example, under the assumption that a number of servlets (whose execution is supported by servlet engine 205) are designed to employ as sub-functions one or more database 206 and/or EJB 207, 208 software components, the GRMG application 210 can best determine the availability of these same software components from the perspective of the servlet engine 205 if the GRMG application 210 is situated with the servlet engine 205 itself.

After the GRMG application 210 forms the response message 212, it is sent to the GRMG infrastructure 209. In the particular embodiment of FIG. 2, the response message 212 is sent by the servlet engine 205 to the web server 204; which, in turn, forwards the message into the network 201. The GRMG infrastructure 209, in response to its reception of the response message 212, provides the availability test results that were expressed within the response message 212 to software that is responsible for generating images on a display 216. The results are then graphically depicted on the display 216 (e.g., in an "alert monitor tree" 215) so that an IS administrator can visually determine the status of the scenario (which, as discussed, may represent a business logic process).

The display 216 may also graphically depict (e.g., in an error tree 214) which scenario monitoring schemes are working and which scenario monitoring schemes are not working. Here, a scenario monitoring scheme should be understood to include the entire monitoring process including: 1) request message 211 generation by the GRMG infrastructure 209 and transportation over the network 201; 2) request message processing and software availability testing by the GRMG application 210; 3) response message 212 generation by the GRMG application 210 and transportation over the network 201; and, 4) response message processing by the GRMG infrastructure 209. Here, a scenario monitoring scheme may "fail" for reasons unrelated to the availability of its corresponding software components. For example, if network 201 is "down" a scenario's request and response messages 211, 212 can not be exchanged even if the scenario's corresponding software components do not have any availability problems with respect to the servlets that use them.

Thus, having an alert monitor tree 215 (which indicates which scenarios do not have software component availability problems and which scenarios have software component availability problems) and an error tree 214 (which indicates which scenario monitoring schemes are "working" and which scenario monitoring schemes are "not working") allows an IS administrator to distinguish between problems that cause software component unavailability and other problems (that are perhaps more fundamental to the workings of the IS infrastructure and the overall scenario monitoring scheme such as those involving network connections) that cause a scenario monitoring scheme to execute improperly.

The GRMG infrastructure 209 is a body of software that is responsible for the continuous sending of request messages on a scenario by scenario basis. As the above described example to which messages 211, 212 were applied was written in the context of a single scenario, note that multiple scenarios may exist that each invoke repeated request and response message exchanges. For example, the GRMG infrastructure 209 might be configured to implement a unique scenario for each unique business logic process that the servlet engine 205 supports; and, orchestrate the sending and receiving of GRMG messages for each of these scenarios.

The GRMG infrastructure 209 may also be configured to communicate with multiple GRMG applications found in different locations across the enterprise. For example, another GRMG application 217 might be included in application server 202 (which is responsible for hosting application 203 among possible others); and, another GRMG application 220 might be included in HTTP server 218 (which is responsible for providing web access for software components located on J2EE server 219). Here, the GRMG infrastructure 209 might be configured to not only orchestrate the sending/receiving of GRMG messages for each of the business logic processes supported by servlet engine 205 but also orchestrate the sending/receiving of GRMG messages for each of the business logic processes supported by application server 202 and HTTP server 218.

The message exchange approaches discussed further below inherently support a range of deployment options with respect to "how many" GRMG applications are installed per scenario. At a first extreme, only one GRMG application exists at a location from which multiple scenarios are tested for component availability. For example, only the single GRMG application 210 is called upon for all of the scenarios to be tested from servlet engine 205. As such request message 211, which is destined for GRMG application 210, could identify any of a plurality of different scenarios.

Alternatively, different GRMG applications may be maintained for different scenarios at a same testing location. For example, at the other extreme, GRMG application 210 may be implemented for only a particular scenario. Thus, request message 211, which is destined for GRMG application 210, would be capable of only identifying a single scenario. Continuing with such an extreme, for each scenario to be tested for component availability as a servlet from servlet engine 205, a separate GRMG application would be instantiated. Likewise, a different GRMG application may be maintained for each scenario testing scheme to be carried out from application server 202 and HTTP server 218.

Embodiments between the extremes discussed above are also inherently supported. Irrespective of how many GRM applications exist per scenario, GRM application 210 may be implemented as a servlet (having its own unique URL (Uniform Resource Locator)) that is dedicated to execute the software component availability testing for its constituent scenario(s). Request message 211 would therefore identify the URL of GRMG application 210 so that it could be executed as a consequence.

Also, as a monitoring option, "single" component scenarios are possible. Single component scenarios are useful for monitoring the availability of a software application as a whole. For example, the GRMG application 220 of HTTP server 218 might be configured to monitor the availability of an entire software application which is installed on J2EE server 219. In this case, because the J2EE server 219 contains the application to be monitored, the HTTP server 218 is an appropriate location from which to determine the availability of the application (e.g., because, during normal usage, the HTTP server 218 is configured to "call" the application in response to a request that was received from the network 201); and, therefore, the HTTP server 218 is an appropriate location for GRMG application 220.

As another side note, a complete GRMG application may be configured into a software package as part of its standard set of available services; or, a GRMG application may be custom tailored by IS personnel so as to service a custom arrangement of software components. For example, the business logic processes associated with servlet engine 205 may have been "custom crafted" by IS personnel because they are unique to the enterprise that the IS infrastructure of FIG. 2 serves. As a consequence, GRMG application 210 may likewise be created by IS personnel so as to properly monitor these custom processes.

By contrast, if the applications supported by application server 202 are standard "off the shelf" applications that are supplied as part of a software vendor's standard product offering, GRMG application 217 may likewise be part of the software vendor's product (that is, since the applications are supplied by the vendor, the vendor is also capable of developing a GRMG application to monitor them). In a further embodiment, which a standard product offering GRMG application may employ, a GRMG application (e.g., GRMG application 217) is geared to call on specific "function modules" that perform specific monitoring functions. Here, a GRMG request message can be configured to call out (e.g., by name) a specific function module to be executed for its corresponding scenario. The GRMG request message may further identify the name of the identified function module being executed.

The monitoring approach of FIG. 2 may also be further used to support technical monitoring. Technical monitoring is the monitoring of foundational components of the IS infrastructure that support the execution of the business logic processes themselves (e.g., such as a Java Network Interface (JNI) through which certain software components are supposed to be accessible). Here, a request message would be sent by the GRMG infrastructure 209 that describes a scenario which identifies one or more foundational components that are to be tested for availability.

Figure 3:
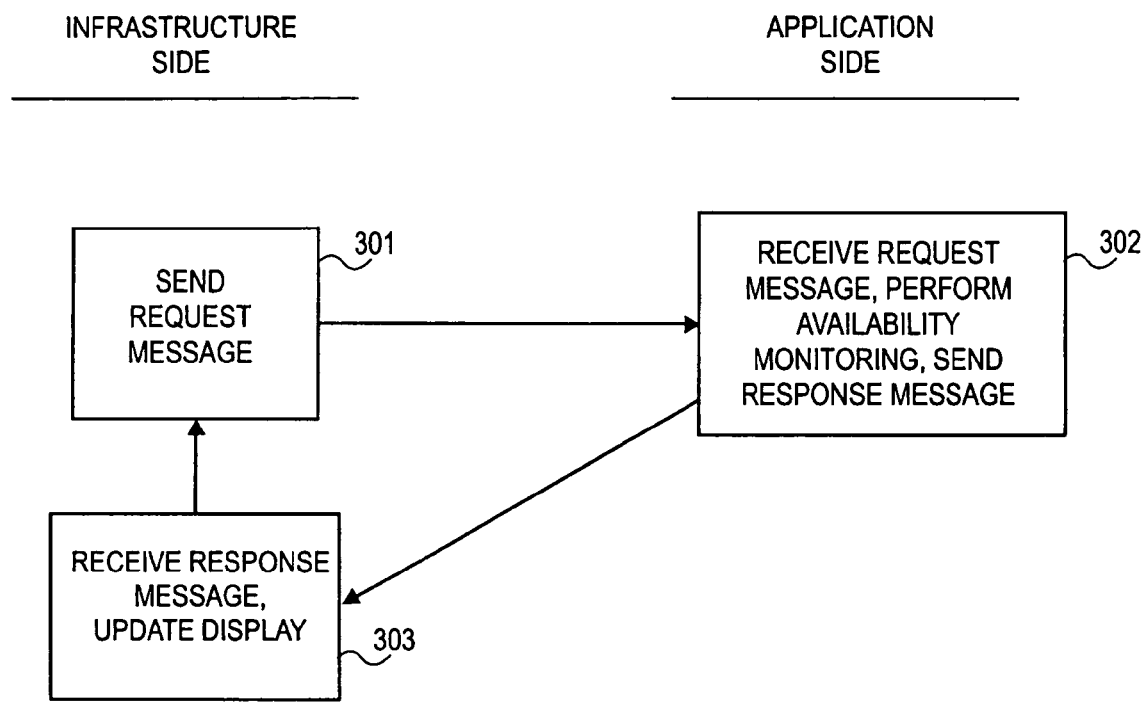
FIG. 3 shows a methodology that can be executed by the IS monitoring approach of FIG. 3.

FIG. 3 outlines a high level methodology that is executed by the monitoring system observed in FIG. 2. According to the methodology of FIG. 3, the GRM infrastructure 209 sends a request message 301 for a scenario to a GRMG application. Upon receipt of the request message the GRMG application 210 performs availability monitoring for the scenario, which may include individual monitoring of its constituent lower level components, and sends a response message 302 back to the GRMG infrastructure 209. The response message provides the availability monitoring results.

The GRMG infrastructure, upon receipt of the response message, forwards the results so that they can be displayed 303. The process then repeats for the scenario. The periodicity of the repetition of the message exchange may be targeted for a set interval (e.g., in minutes). In an embodiment, the process observed in FIG. 3 is multi-dimensional in the sense that one such process is executed for each scenario to be monitored. For example, if 1,000 different scenarios are to be monitored, 1,000 instances of the methodology are effectively executed that may involve a plurality of GRMG applications distributed across various locations within the enterprise's IS infrastructure.

GRMG Infrastructure & Request Message

Figure 4:
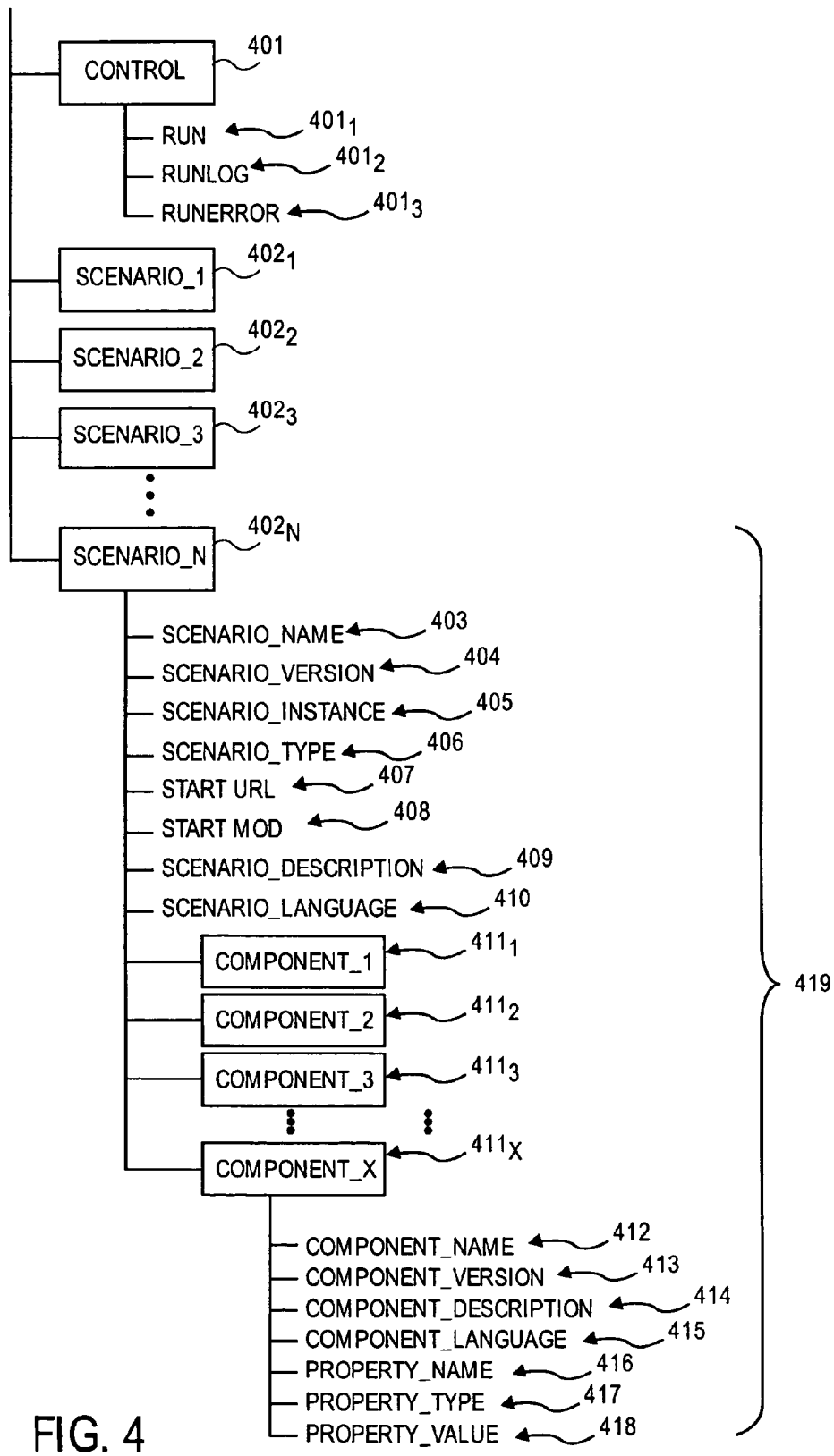
FIG. 4 shows an embodiment of a customizing file such as customizing file 213 of FIG. 2.
Figure 5A:
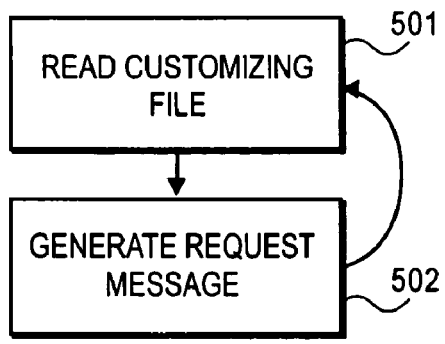
FIG. 5a shows a methodology that can be executed by the GRMG infrastructure 209 of FIG. 2.
Figure 5B:
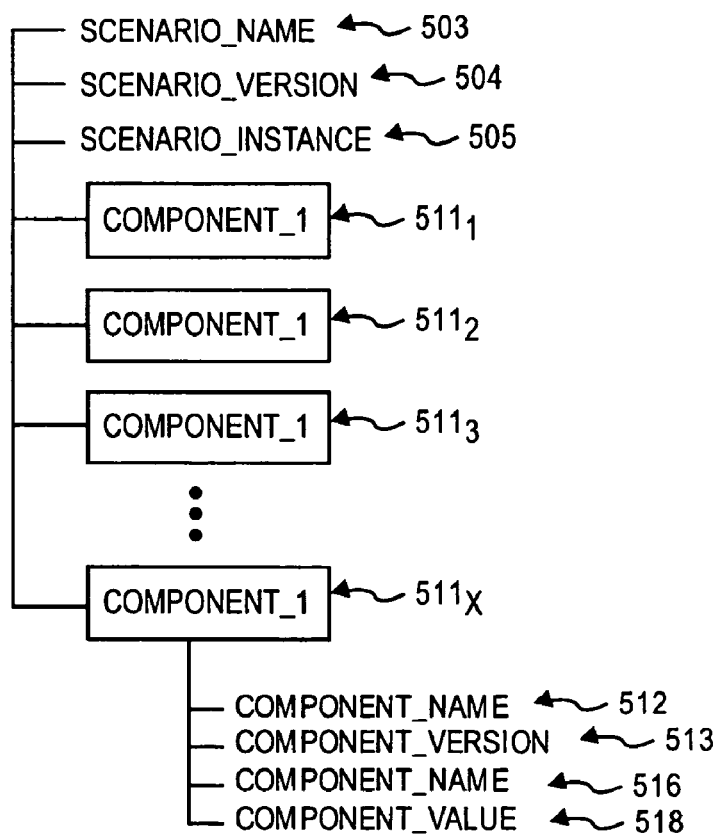
FIG. 5b shows an embodiment of a GRMG request message such as the GRMG request message 211 of FIG. 2.

FIGS. 4, 5a and 5b relate to GRMG infrastructure and request message embodiments. Specifically, FIG. 4 provides an embodiment of an organization scheme that may be used for a customizing file; FIG. 5a shows a process that may be executed by the GRMG infrastructure; and, FIG. 5b shows an embodiment of an organization scheme that may be used for a request message. Referring briefly to FIGS. 2 and 5a, a customizing file 213 is used as the base resource from which request messages are spawned. Specifically, the GRMG infrastructure reads 501 information from the customizing file; and, based upon the information discovered in the customization file, the GRMG infrastructure generates a request message 502.

The process of reading the customizing file and generating a request message from the information that is read from the customizing file may be repeated across scenarios as well as for any particular scenario. Better said, if multiple monitoring scenarios are to be executed, multiple request messages will be executed for each scenario (i.e., a first scenario will result in the repetitive production of a first request message; a second scenario will result in the repetitive production of a second request message; etc.). Here, the customizing file may be partitioned into different regions where each region contains information for a specific scenario.

If so, the GRMG infrastructure is expected to refer to the appropriate region of the customizing file in order to generate a request message for a specific scenario (e.g., a first section of the customizing file is referred to in order to generate a request message for a first scenario; a second section of the customizing file is referred to in order to generate a request message for a second scenario;, etc.). FIG. 4 shows an embodiment of an organization scheme for a customizing file that includes information for each of a plurality of scenarios (so that a unique request message can be generated for each scenario). The organization scheme entails listing basic control information 401 as well as the information for each the scenarios $402_1$ through $402_N$. In an embodiment, the customizing file is in the format of a document that is capable of supporting the execution of software (e.g., an .XML document). As such, the information is embodied in the appropriate format for the document.

According to the embodiment of FIG. 4, the basic control information 401 is used to control the execution of the GRMG infrastructure itself and includes a "run" field $401_1$; a "runlog" field $401_2$; and, a "runerror" field $401_3$. The run field $401_1$ specifies whether the GRMG infrastructure that would use the customizing file is running or not. In a further embodiment, the customizing file is in the form of a document such as an .XML document. As an example, an "X" marked at the appropriate location in the .XML document may indicate that the applicable GRMG infrastructure is running and the lack of an "X" may indicate that the corresponding GRMG infrastructure is not running.

The runlog field $401_2$ specifies whether or not a log file is to be created at runtime for the GRMG infrastructure. The log file, once created, could include typical log entry information such as a log entry timestamp for each generated request message. Referring briefly back to FIG. 2, note that a database 221 is drawn as being coupled to the GRMG infrastructure 209. Here, database 221 could be used to implement the log file (e.g., as a table) that records the log entries. Similarly, the errorlog field $401_3$ specifies whether or not an error log file is to be created for the GRMG infrastructure. The error log file could include typical error log entry information such as a timestamp and description of each error that arose during execution of the GRMG infrastructure. Database 221 could be used to implement the error log file (e.g., as a table) that records the error log entries.

The exemplary customizing file embodiment of FIG. 4 also indicates that messaging for a plurality of N scenarios are to be supported. As such a separate body of information is included for each scenario $402_1$ through $402_N$; where, for illustrative simplicity, only a breakdown of the information included for scenario $402_N$ is shown in detail. A similar collection of information should be included for the other scenarios. According to the embodiment of FIG. 4, the breakdown of information for a particular scenario includes: 1) the scenario name 403; 2) the scenario version 404; 3) the scenario instance 405; 4) the scenario type 406; 5) the starting URL for the scenario 407; 6) the start module for the scenario 408; 7) a description of the scenario 409; 8) the language of the scenario description 410; and, 9) a breakdown of information for each component $411_1$ through $411_X$ that is to be checked for availability for the particular scenario.

Items 403 through 410 correspond to "control" items that apply to the scenario as a whole while items $411_1$ through $411_X$ correspond to bodies of information that pertain to a specific component that is to be tested for availability. The scenario name field 403 provides the name of the scenario. The scenario version field 404 provides the version of the scenario.

The scenario instance field 405 provides the instance of the scenario. Here, for example, suppose that a particular business logic process is correlated with a particular scenario; yet, there are a number of different "ways" that components of the business logic process could be tested for availability (e.g., a first way includes a first group of components, a second way includes a second group of components (where some degree of overlap between the first and second groups may or may not exist), etc.). To handle this, multiple instances of the scenario that is identified with the business logic process may be created. The scenario instance field 405 identifies "which instance" of the scenario the particular body of information it is included with corresponds to. In an embodiment, a different number is used to identify each instance of the scenario; and, therefore, the scenario instance field 405 provides the number of the scenario instance it is included with the information of.

The scenario type field 406 identifies how the appropriate GRMG application for the scenario instance is to be reached. Here, as there exist a number of different ways in which executable routines may be called upon, the manner that is identified in the scenario type field 406 should be consistent with the manner in which the GRMG application that is to be executed for the scenario instance has been implemented. For example, if the appropriate GRMG application for the scenario instance is a Java servlet (e.g., to be executed by servlet engine 205 of FIG. 2) that is reachable with a URL address; then the scenario type field 406 will indicate that a URL is to be specified in the request message. Alternatively, if the appropriate GRMG application for the scenario instance is reachable with an RFC (Remote Function Call) destination, the scenario type field 406 will indicate that HTTP should be used in the sending of the request message.

The "start URL" field 407 contains the specific address or destination identifier of the target GRMG application for the scenario. In an embodiment, the URL of the appropriate GRMG application is specified in the start URL field 407 if the type field 406 indicates a URL type; or, the RFC destination of the appropriate GRMG application is specified in the start URL field 407 if the type field 406 indicates an HTTP type. Here, the RFC destination may include an encrypted user name and password.

Recalling from the discussion of FIG. 2 that a GRMG application (e.g., GRMG application 217) may be geared to call on a specific "function modules" that perform specific monitoring functions. If the target GRMG application for the scenario is such a GRMG application, the start module field 408 identifies the module to be invoked by the GRMG application. The description field 409 contains a description of the scenario instance (e.g., a textual description of the scenario); and, the language field 410 indicates what language the description that resides within the description field 409 is written in.

Items $411_1$ through $411_X$ correspond to bodies of information that pertain to each specific component that is to be tested for availability by the appropriate GRMG application during the test sequence of the scenario. An embodiment of information that may be associated with component $411_X$ is observed in FIG. 4. A similar collection of information should be included for the other components. According to the approach of FIG. 4, the body of information for a component includes: 1) a component name field 412; 2) a component version field 413; 3) a component description field 414; 4) a component language field 415; 5) and property fields 416-418 for the passing of a parameter for the component from the GRMG infrastructure (by way of the corresponding request message) to the appropriate GRMG application. The property fields include a property name field 416, a property type field 417; and, a property value field 418.

The component name field 412 provides the technical name of the specific component to be monitored for availability. The component version field 413 provides the specific version of the component to be monitored for availability. The component description field 414 contains a description of the component (e.g., a textual description of the component); and, the component language field 415 indicates what language the description that resides within the component description field 415 is written in. In an embodiment, the description is used as the name of the component and contains the host name for the component and an instance number for the component.

The property fields 416-418 are used to send a parameter pertaining to the component's availability testing from the GRMG infrastructure to the appropriate GRMG application (by way of a request message). The property name field 416 identifies the name of the parameter, the property type field 417 identifies the parameter's type, the property value field 418 provides the value of the parameter.

As an example of how these fields might be used, if the software component to which property fields 416-418 are dedicated corresponds to a web page, the URL of the web page would be provided to the GRMG application by embedding information contained in these fields 416-418 into the corresponding request message. For example, the name field 416 may include the notation "URL" to indicate a URL is needed to fetch the web page component; and, the value field 418 might provide the specific URL value of the web page (e.g., "http://localhost/index_test.html").

As another example of how these fields might be used, if a login procedure is required to verify availability, a chain of property field groups could be used to provide the information needed to perform the login. For example, a first group of name and value fields would indicate that a client is to be used for the login (e.g., name=Client) as well as identify the specific client (e.g., value="000"). A second group of name and value fields would indicate that a userid is to be used for the login (e.g., name=userid) as well as specify the actual userid to be used for the login (e.g., value="KOJEVNIKOV"). A third group of name and value of fields would be used to indicate that a password is to be entered for the login (e.g., name=password) as well as specify the particular password to be used for the login (e.g., value="tstpw").

FIG. 5a shows a process that may be executed by the GRMG infrastructure; and, FIG. 5b shows an embodiment of an organization scheme that may be used for a request message. Again, referring briefly to FIGS. 2 and 5a, recall that a customizing file 213 (such as a customizing file having the organization scheme depicted in FIG. 4) is used as the base resource from which request messages are spawned. Specifically, the GRMG infrastructure reads 501 information from the customizing file; and, based upon the information discovered in the customization file, the GRMG infrastructure generates a request message 502. In an embodiment, the customizing file is uploaded and its contents are written into a database table (such as table of database 221). The GRMG infrastructure 209 then reads from the database table in order to perform read 501 of FIG. 5a. Although the customizing file may be read multiple times (as suggested by FIG. 5a), alternatively, the customizing file may be read only once and its contents stored in database tables. The database tables are then referred to (rather than the customizing file itself) in order to generate a request message.

As already discussed, the process of reading the customizing file and generating a request message from the information that is read from the customizing file may be repeated across scenarios as well as for any particular scenario. Better said, if multiple monitoring scenarios are to be executed, multiple request messages will be executed for each scenario (i.e., a first scenario will result in the repetitive production of a first request message; a second scenario will result in the repetitive production of a second request message; etc.). Here, the customizing file may be partitioned into different regions where each region contains information for a specific scenario and the GRMG infrastructure is expected to refer to the appropriate region of the customizing file in order to generate a request message for a specific scenario (e.g., a first section of the customizing file is referred to in order to generate a request message for a first scenario; a second section of the customizing file is referred to in order to generate a request message for a second scenario; etc.).

FIG. 5b shows an embodiment of the contents and organization of the payload of a request message that may be sent for a particular scenario. The particular request message embodiment of FIG. 5b can be viewed as the organization and content of the request message that is sent for the scenario that is described in section 419 of the customizing file embodiment of FIG. 4. Note that it possesses a significant degree of overlap with respect to the organization and content of the section 419.

Here, the request message 502 could be crafted simply by copying the content of: 1) the scenario name field 403 of the customizing file into the scenario name field 503 of the request message; 2) the scenario version field 404 of the customizing file into the scenario version field 504 of the request message; 3) the scenario instance field 405 of the customizing file into the scenario instance field 505 of the request message; and, 5) attributes of the component specific information fields $411_1$-$411_X$ of the customizing file into the component specific information fields $511_1$-$511_X$ of the request message. For example, as applied to the "$X^{th}$" component, the content of the component name, component version, property name and property value fields of the customizing file 412, 413, 416, 418 could be copied into the component name, component version, property name and property value fields of the request message 512, 513, 516, 518.

In an embodiment, the request message is a document such as an .XML document. Use of such documentation should make the copying of content from the customizing file to the request message a straightforward process.

GRMG Application & Response Message

Recall that the message exchange approaches discussed herein inherently support a range of deployment options with respect to "how many" GRMG applications are installed per scenario. At a first extreme, only one GRMG application exists at a location from which multiple scenarios are tested for component availability. For example, referring to FIG. 2, only the single GRMG application 210 is called upon for all of the scenarios to be tested from servlet engine 205. As such request message 211, which is destined for GRMG application 210, could identify any of a plurality of different scenarios.

Alternatively, different GRMG applications may be maintained for different scenarios at a same testing location. For example, at the other extreme, GRMG application 210 may be implemented for only a particular scenario. Thus request message 211, which is destined for GRMG application 210, would be capable of only identifying a single scenario. Continuing with such an extreme approach, for each scenario to be tested for component availability as a servlet from servlet engine 205, a separate GRMG application would be instantiated. Likewise, a different GRMG application may be maintained for each scenario testing scheme to be carried out from application server 202 and HTTP server 218.

Embodiments between the extremes discussed above are also inherently supported. Irrespective of how many GRMG applications exist per scenario, GRMG application 210 may be implemented as a servlet (having its own unique URL) that is dedicated to execute the software component availability testing for its constituent scenario(s). Request message 211 would therefore identify the URL of GRMG application 210 so that it could be executed as a consequence.

Figure 6A:
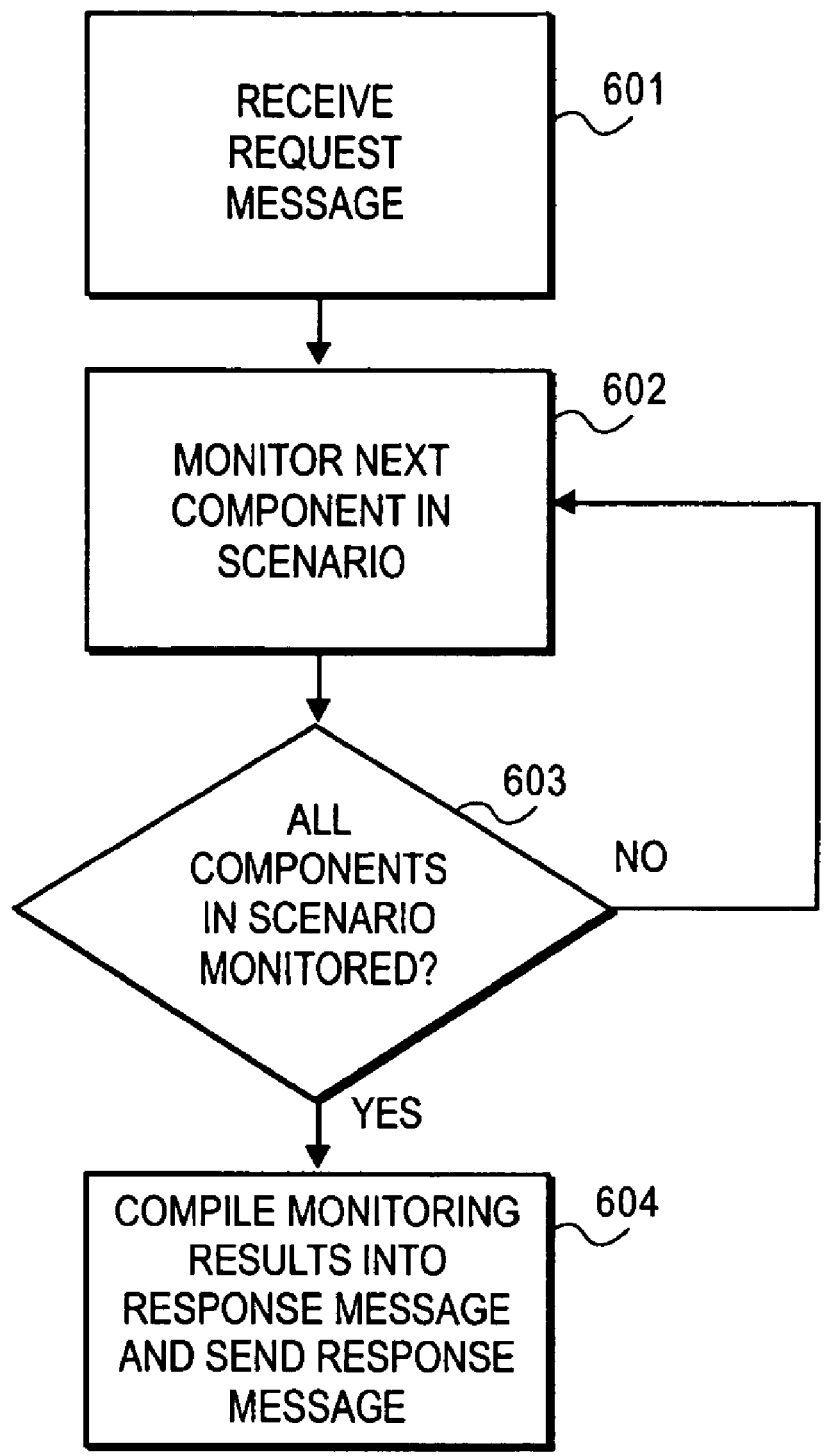
FIG. 6a shows a methodology that can be executed by the Generic Request and Message Generation (GRMG) application 210 of FIG. 2.
Figure 6B:
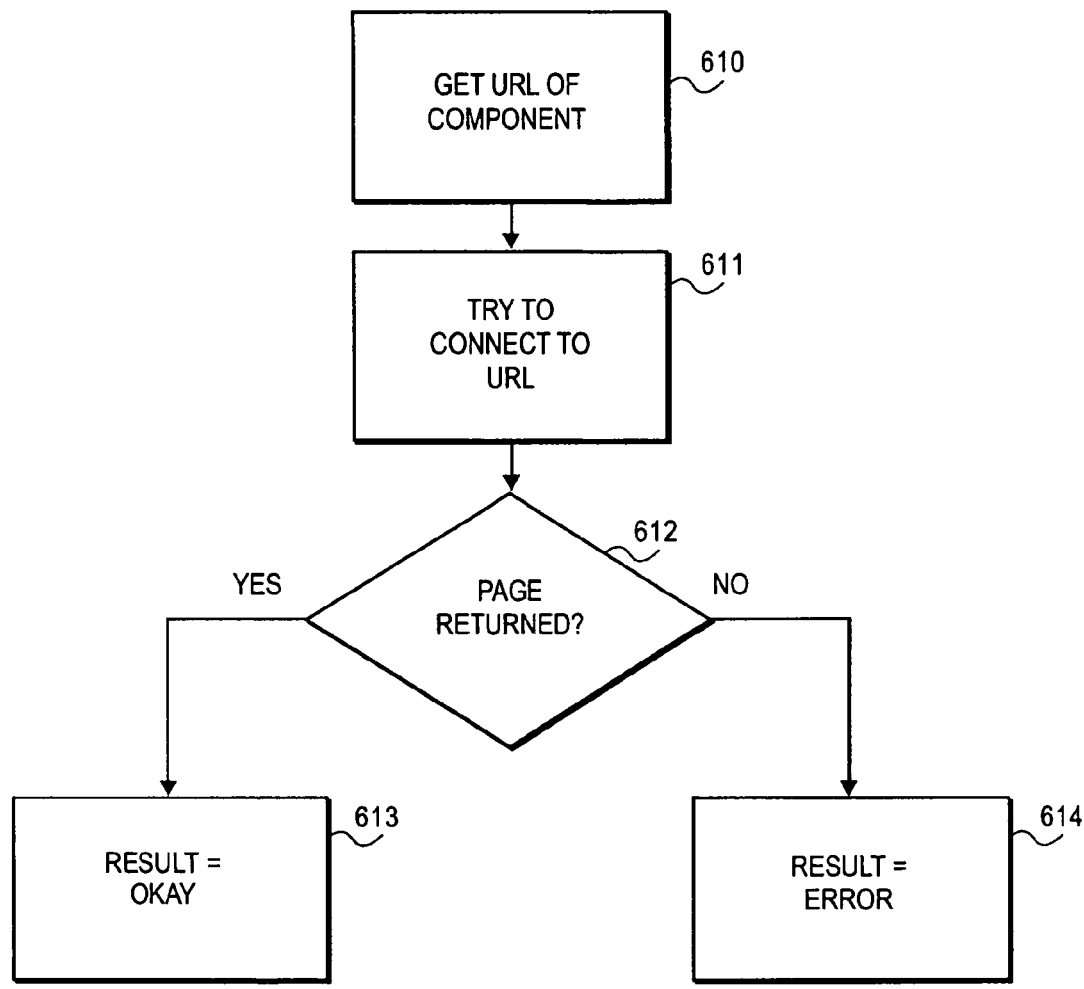
Figure 6C:
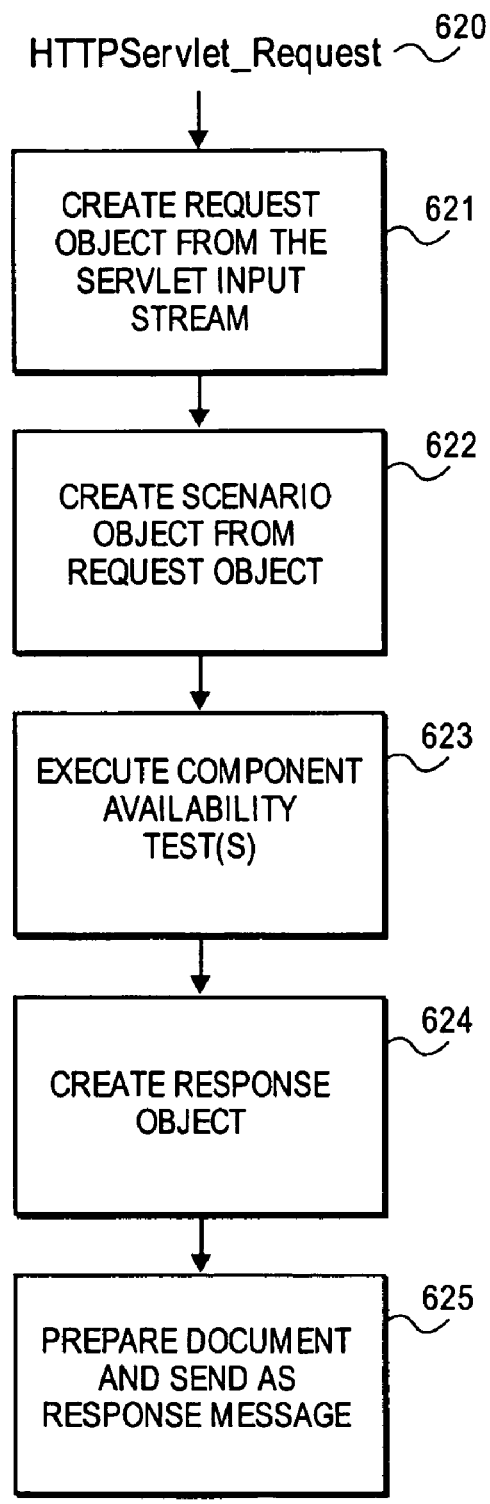
FIG. 6c shows an embodiment of an object oriented GRMG application flow.

FIGS. 6a through 6c provide exemplary methodologies that may be designed into a particular GRMG application. FIG. 6a shows an embodiment of a primary "end-to-end" GRMG application process. FIG. 6b shows an embodiment of an availability test that may be applied to a specific software component. FIG. 6c provides an exemplary "end-to-end" GRMG application flow that may be used within an object oriented environment such as a Java environment. According to the primary end-to-end process of FIG. 6a, a GRMG application receives and processes a request message 601. As discussed above with respect to FIG. 2, the request message may contain the identity of multiple components that need to be tested for availability.

As such, each component identified in the request message is monitored to see if it is available 602, 603. A recursive approach is depicted in FIG. 6a. When a disposition has been reached on each of the components with respect to its availability (e.g., "OKAY" or "ERROR"), a response message is prepared and sent to the GRMG infrastructure that tabulates these results 604. An embodiment of the organization of a response message is provided and discussed in more detail below with respect to FIG. 7.

FIG. 6b shows an embodiment of an availability test that may be used to test the availability of a web page component. Here, for example, a business logic process may require a web page to be fetched at some point during its execution. In this case, the web page is deemed a component of the scenario for whom a request message was received 601; and, as described above (e.g., with respect to FIG. 5b), the request message would identify the web page component (e.g., by name and version). In this case, the methodology of FIG. 6b could be used by the GRMG application to determine whether or not the web page is available.

According to the methodology of FIG. 6b the URL address of the web page component is fetched and an attempt is made to connect to the URL address 610, 611. If a web page is returned 612 as a consequence of the connection attempt 611 the component web page is deemed available and a positive disposition is registered 613 (e.g., "OKAY"). If a web page is not returned as a consequence of the connection attempt 611 the component web page is deemed unavailable and a negative disposition is registered 614 (e.g., "ERROR").

Recall from the discussion of FIG. 2 that the GRMG application may be custom made by IS personnel or simply purchased from a software vendor. In those instances where the IS personnel are expected to custom craft their own GRMG application, a software vendor may nevertheless provide a suite of tools used to support the IS personnel in their custom GRMG application development efforts. For example, in one embodiment that applies to an object oriented environment (such as Java), a predefined set of classes are provided for GRMG application development. Such classes may include: 1) a class for a request message; 2) a class for a response message; 3) a class for a scenario; 4) a class for a component; 5) a class for a component parameter; and 6) a class for a component message.

In a potentially related embodiment, a servlet is used to implement the GRMG application itself. Thus, in a Java environment, a Java servlet may be used to implement the GRMG application. Here, continuing with the idea from above that a suite of tools may be provided to help create a custom GRMG application, FIG. 6c illustrates a detailed embodiment of a flow for code that could be formed with supplied Java classes for building a custom GRMG application implemented as a Java servlet.

According to the code flow of FIG. 6c, an "HTTPServlet Request" 620 is used to invoke the GRMG application. In response to the invocation the GRMG application, with the above mentioned request message class, creates a "request" object from the input stream of the servlet 621 (where the input stream of the servlet corresponds to the content of the received request message). As the request object would identify the scenario, a "scenario" object is further created from the request object 622 (e.g., with the above mentioned scenario class).

Then custom code used to perform availability testing (such as the process described in FIG. 6b) is executed 623. Here, the results of the availability testing would be associated with the "scenario" object. After the availability testing is complete a "response" object is created 624 (e.g., with the above mentioned response class) using the scenario object for information that will be used to makeup the content of the request message. A document is then prepared and sent as the servlet output stream which corresponds to the sending of the response message 625. In a further embodiment, the document is an .XML document.

Figure 7:
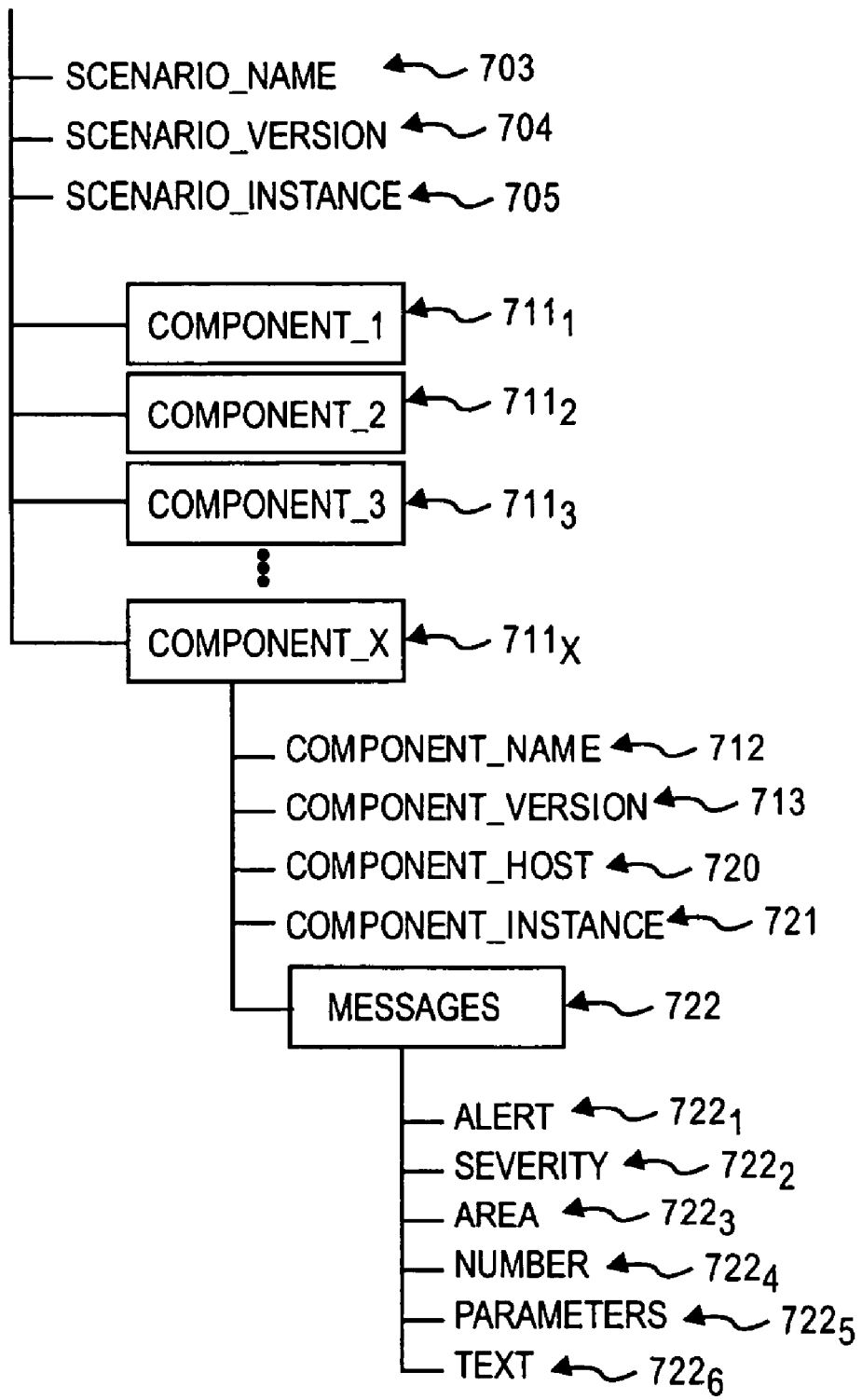
FIG. 7 shows an embodiment of a GRMG response message such as the GRMG response message 212 of FIG. 2.

FIG. 7 shows an embodiment of an organization scheme for the layout of the payload of a response message. According to the layout embodiment of FIG. 7, the response message includes: 1) a scenario name 703; 2) a scenario version 704; 3) a scenario instance 705; and, 4) information regarding each component in the scenario that was tested $711_1$-$711_X$. The information for a component includes (depicted only for component $711_X$ for purposes of illustrative simplicity): a) the component's name 712; b) the component's version 713; c) the component's host 720; d) the component's instance 721; and, e) message information that provides information regarding the testing results for the component 722. The messaging information includes: i) an alert message $722_1$; ii) a severity parameter $722_2$; and, iii) area, number, parameters and text fields for transporting a specific message $722_3$-$722_6$. A discussion of each of these is provided immediately below. In an embodiment, the response message is embodied as a document such as an .XML document.

The scenario name, scenario version and scenario instances 703, 704, 705 "repeat" the information provided in the scenario name, version and instance parameters 503, 505, 505 originally provided in the request message (e.g., as depicted in FIG. 5b). Here, as a response message effectively replies to a request message, the scenario name, version and instance act as a signature for a specific group of one or more component tests. With the signature, the GRMG Infrastructure is able to keep track of a plurality of requests for different groups and a plurality of received responses for different groups. From the perspective of the GRMG application, the preparation of a response message 604 may involve copying the scenario name, version and instance fields from the request message that is being responded to. In embodiments where the request and response messages are in a document format (such as .XML) this should be a straightforward procedure.

With respect to the component specific information 711, the component name and component version parameters 712, 713 identify the particular component for which availability results are being presented. Again, in an embodiment, these values are copied directly from the corresponding values 512, 513 (e.g., as depicted in FIG. 5b) found in the request message to which the response message is responding. The component host 720 parameter identifies the name of the particular host or server that the software component is running on. The component instance 721 parameter is a reference number that identifies the instance of the component on the host/server on which the component is running.

In an embodiment, both of these parameters are determined by the GRMG application and are not provided in the request. Component instances may derive from multiple or redundant software components on a single host or server in the IS infrastructure. For example, if three "copies" of the same software component exist on a host; then, it is possible that any of these three copies may be used to support the business logic flow/application that the scenario corresponds to. As such, three separate instances of the component exist; and, field 721 would identify which one was tested for availability.

The component specific information depicted in the embodiment of FIG. 7 also includes a number of "message" parameters 722 used for explaining the result(s) of the component's availability test. Here, the alert parameter $722_1$ indicates whether the test result is "OKAY" or is deemed to be an "ERROR" (e.g., by providing "OKAY" or "ERROR" text in the alert parameter field $722_1$). The severity parameter $722_2$ indicates how serious an error is. In an embodiment, the severity parameter is a number within a specified range (e.g., a number between a range of 0 and 255) where the severity of the error scales in a specific direction over the range. For example, the higher the number the more serious the error.

The area, number and parameters fields $722_3$-$722_5$ are used to provide numerically encoded messages. Here a specific encoding scheme is envisioned where the numeric code is broken down into three sections (area, number and parameters). The area field $722_3$ numerically defines a class of messages. The number field $722_4$ numerically defines a specific message within the class specified by the area value. The parameters field $722_5$ are for parameters that are to be included with a numerically encoded message that contemplates the inclusion of parameters with the message itself. If numerically encoded messages are employed, it is assumed that the GRMG Infrastructure is configured with functionality sufficient for decoding the messages.

The text field $722_6$ is used to provide textual messages rather than numerically encoded messages. In an embodiment, the GRMG application has the option of sending both a numerically encoded message and a textual message; or, sending only a numerically encoded message or textual message. As described in more detail below with respect to the display, message information may be displayed (e.g., so that IS personnel can graphically read the message sent from the GRMG application). According to an embodiment, if the number provided in the area field $722_3$ is not recognized, the display will present whatever is presented in the text field $722_6$.

Alert Monitor and Error Tree Displays

Recall that alert monitor 215 and error 214 tree displays were first discussed with respect to FIG. 2. Recall from the discussion of FIG. 2 that availability results received by the GRMG infrastructure through the response messages may be graphically depicted in an alert monitor tree 215 that is presented on a display 216 (e.g., as part of a graphical user interface (GUI) so that an IS administrator can visually determine the status of a scenario.

The display 216 may also graphically depict in an error tree 214 (again as part of a GUI) which scenario monitoring schemes are not working properly. A scenario monitoring scheme should be understood to include the entire monitoring process including: 1) request message 211 generation by the GRMG infrastructure 209 and transportation over the network 201; 2) request message processing and software availability testing by the GRMG application 210; 3) response message 212 generation by the GRMG application 210 and transportation over the network 201; and, 4) response message processing by the GRMG infrastructure 209.

A scenario monitoring scheme may "fail" for reasons unrelated to the availability of its corresponding software components. For example, if network 201 is "down" a scenario's request and response messages 211, 212 can not be exchanged even if the scenario's corresponding software components do not have any availability problems with respect to the servlets that use them.

Thus, having an alert monitor tree 215 (which indicates which scenarios have software component availability problems) and an error tree 214 (which indicates which scenario monitoring schemes are "not working") allows an IS administrator to distinguish between problems that cause software component unavailability and other problems that cause a scenario monitoring scheme to execute improperly.

Alert Monitor Tree

Figure 8:
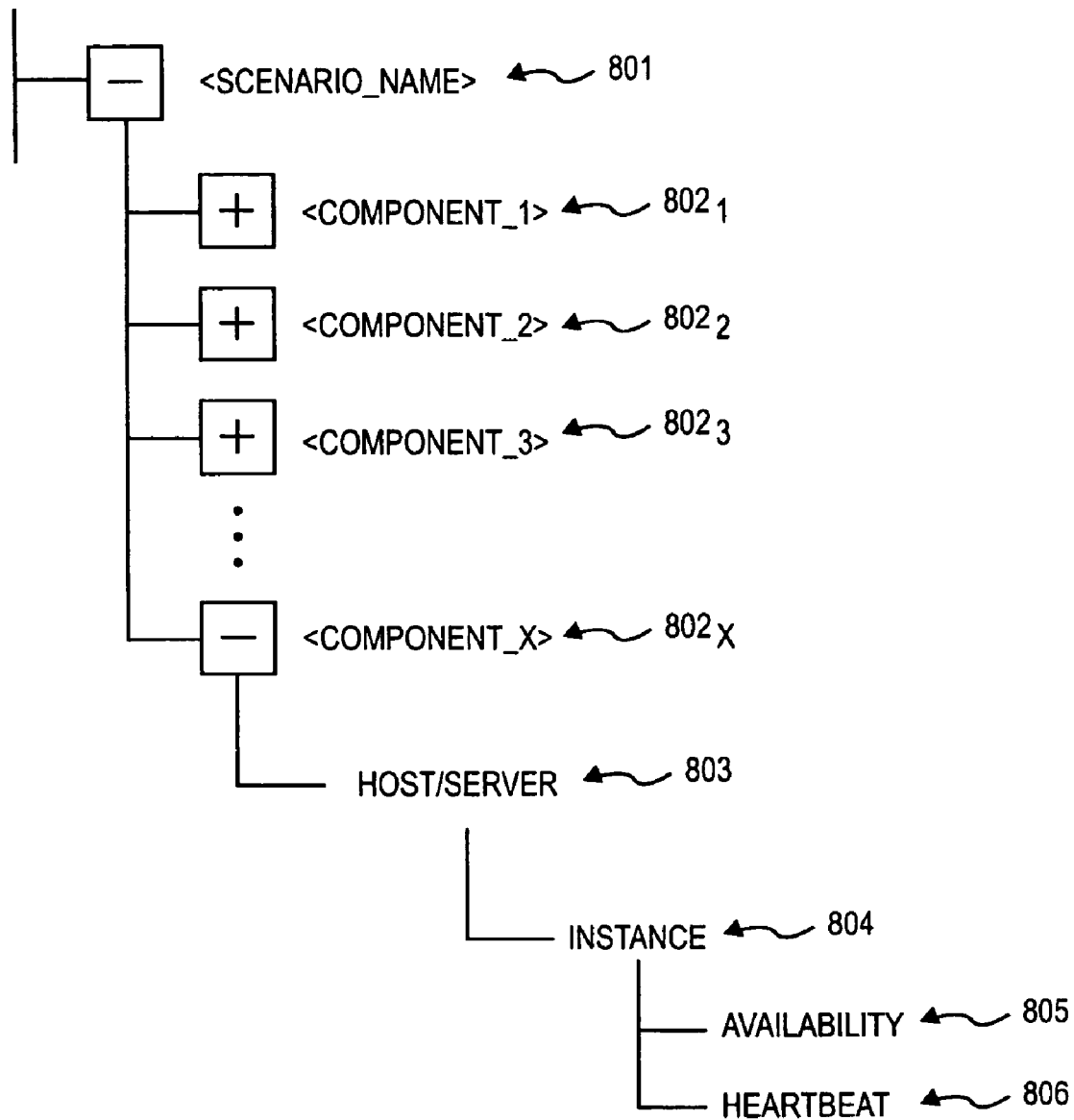
FIG. 8 shows an embodiment of an alert monitor tree structure that indicates scenario component availability that may be displayed on a display such as display 216 of FIG. 2.
Figure 9:
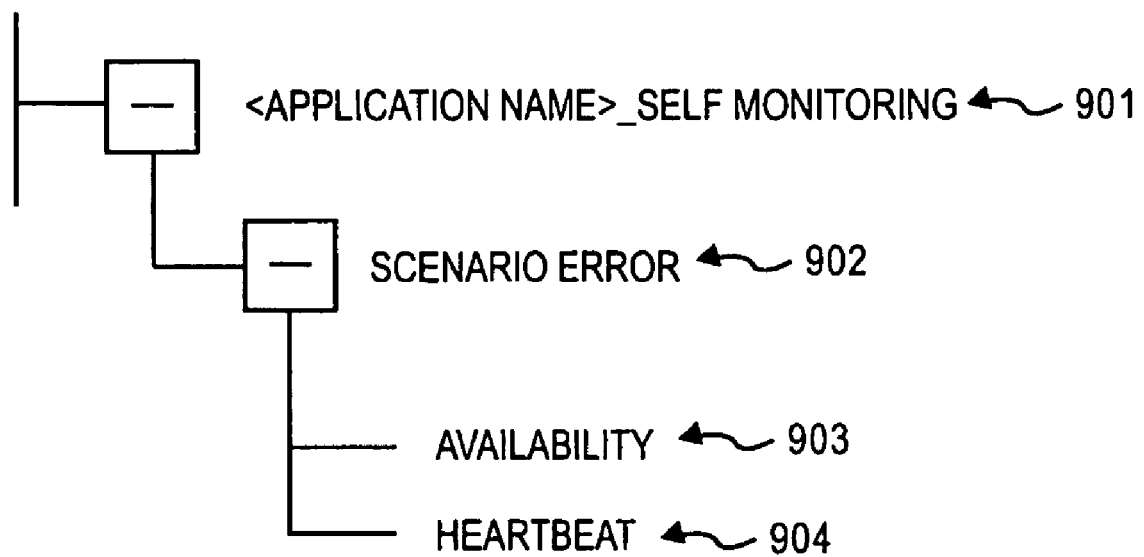
FIG. 9 shows 9 as an embodiment of an error tree structure that indicates scenario availability that may be displayed on a display such as display 216 of FIG. 2.

FIG. 8 shows an embodiment of an alert monitor tree and FIG. 9 shows an embodiment of an error tree display. According to the embodiment depicted in FIG. 8 the alert monitor tree includes a primary node 801 which identifies the name of the scenario. Here, the name of the scenario may be "passed up" from the GRMG infrastructure with ease because of its dealings with an identical parameter in the customizing file 403, request messaging 503 and response messaging 703 (as previously depicted in FIGS. 4, 5b and 7, respectively). In an alternative embodiment, information from the "scenario description" 409 is passed up from the GRMG infrastructure and presented at primary node 801.

As discussed, a scenario may be configured to correspond to a business logic process or other software application; and, therefore, the name given to the scenario may be identical to that given to the business logic process or other software application. The secondary nodes 802 that are connected in the alert monitoring tree to the primary node 801 correspond to the individual components of the scenario $802_1$-$802_X$. In an embodiment, the names for the components that are displayed next to the component nodes in the alert monitoring tree originate from the component description field 414 of the GRMG infrastructure's customizing file (e.g., as previously depicted in FIG. 4). In an alternative embodiment, information describing a component (e.g., as provided from location 416 of FIG. 4) is provided by the GRMG infrastructure and displayed at the secondary nodes 802.

A subtree is capable of being displayed from each component node. For illustrative convenience, only the node $802_X$ associated with the $X^{th}$ component is observed in FIG. 8. In an embodiment to which FIG. 8 corresponds, the primary node 803 of the subtree specifies the host or server that the component is running on. Recall from the discussion of FIG. 7 that the response message may provide this information (i.e., component host 720). Thus, in a further embodiment, the host or server that is identified by the component host 720 value in the received response message for the scenario is identified as a node 803 in the component's subtree.

In an embodiment, the technical name of the component is added as a prefix to the host name observed in the subtree at node 803. For example, if the technical name of the component is "SWP_Comp" and the host name is "Host3753"; then, the text next to node 803 might would read "SWP_Comp Host3753". The technical name for the component may be provided from the component name value 412, 512, 712 values found in the customizing file, request message and response message for the scenario (e.g., as respectively depicted in FIGS. 4, 5b and 6).

Recall from the discussion of the response message with respect to FIG. 7 that the GRMG application may also include in the response message the instance of the component 721. In an embodiment a unique node exists in the component's subtree for each unique instance of the component that runs on a particular host (recalling from the request message discussion concerning FIG. 7 that component instances may derive from multiple or redundant software components on a single host within the IS infrastructure).

Thus, for example, if three separate instances existed for the $X^{th}$ component (and response messages that identified them where received by the GRMG infrastructure); then, two additional nodes would exist in the subtree beneath node 803 other than node 804. In an embodiment, the technical name of the component and the name of the host is added as a prefix to the numeric identifier associated with the instance. For example, continuing with the example above where the component name is "Comp_SWP" and the host name is "Host3753", if the reference number for the instance is "1"

(which may be done for a single instance as depicted in FIG. 8); then, the text next to node 804 would read "SWP_Comp Host3753 1". In an alternate embodiment, the status of the availability testing service for the instance is identified as either being "off" or "on" at tree node 804 (e.g., "Run Status: Broadcast Messaging Server on").

The availability and heartbeat nodes 805, 806 present the actual monitoring results for the component. In an embodiment the percentage availability of the component (e.g., the number of OKAY responses normalized by the number of attempted availability tests for the component) is displayed next to the availability node 805. In an embodiment, the percentage availability corresponds to the percentage availability that has been demonstrated over a set period of elapsed time (e.g., the number of OKAY responses normalized by the number of attempted availability tests for the component that have occurred within the past fifteen minutes).

Actual messages pertaining to the component that were contained in received response messages can be displayed next to the heartbeat node 806. Recalling the discussion of the response messages that was provided above, and referred to FIG. 7, recall that items for conveying messages 722 were specifically provided for. Here, for example, the actual textual message (e.g., "component is alive") to which a numeric encoding was provided by way of the area, number (and perhaps number) fields $722_3$-$722_5$ in a received response message for the component may be displayed next to the heartbeat node 806 in the display. Likewise, a textual message received in a response message for a component (e.g., as contained in field $722_6$ of the response message embodiment of FIG. 7) can also be displayed. In an alternative embodiment, a status indication is provided rather than message text.

In a further embodiment, received messages are logged by being stored into a database (e.g., database 221 of FIG. 2). Here, a pushbutton may be provided for in a toolbar in the GUI to which the display pertains. When the heartbeat icon is marked and the pushbutton clicked on, the log of received messages for the component are displayed. Colors may also be used to convey which components are available and which components are unavailable. For example, in one embodiment, messages associated with a component deemed "OKAY" (e.g., as indicated in the alert field 723, of the response message embodiment of FIG. 7) are presented in green; and, messages associated with a component deemed "OKAY" (e.g., as indicated in the alert field 723, of the response message embodiment of FIG. 7) are presented in red.

Also, the ordering of the display alert monitor tree may be affected by the severity of an error as expressed in a response message. For example, according to one approach, alerts given a higher degree of severity (e.g., as expressed in severity field $722_2$ in the response message embodiment of FIG. 7) are moved upward in the alert monitor tree.

Error Tree

FIG. 9 shows an embodiment of an error monitor tree which indicates whether or not a scenario is working. According to the error tree embodiment of FIG. 9, a primary node 901 is used to indicate that the GRMG system as a whole is being self monitored. That is, consistent with the preceding discussion that was provided immediately above, the alert monitor and error trees may be part of a larger integrated IS monitoring system that is responsible for displaying other "alerts" or problems with trees presented in a GUI display. Here, the error tree of FIG. 9 is drawn as being a subtree of a larger tree structure (i.e., primary node 901 has a tree structure to its left).

The primary node 901 therefore is responsible for indicating to the viewer that its corresponding tree (e.g., with nodes 902 through 904) is for recognizing errors in the GRMG monitoring scheme as a whole. As such the "application name" associated with the primary node should be given a name that identifies the GRMG monitoring system as a whole (e.g., "GRMG Self Monitoring). The remaining subtree components are used simply to display error messages relating to specific scenarios. Thus, if a scenario is deemed non operational, text next to the scenario error node 902 identifies a scenario that is experiencing an error and the text next to the heartbeat node 904 displays a specific error message.

In an alternate embodiment that allows working and non working scenarios to be represented, the status as to whether or not a scenario is currently being tested is displayed at node 902 (e.g., "Run Status: GRMG messaging service on), the availability node 903 indicates the percentage of scenario testing schemes that have executed successfully for the scenario; and, the heartbeat node 904 displays a specific error message.

In an embodiment, the underlying software for the alert monitoring tree and the error monitor tree overlap in structure so that a heartbeat node 903 is displayed; however, no real use is made of the heartbeat node because only "unavailable" scenarios having error alert messages for represented for display.

The following is pair of possible error messages that may be displayed for a non working scenario and their corresponding causes.

1. Error Messages: "HTTP POST Failure: HTTP Communication Error"; "HTP POST Failure: Connect Failed"; or, "HTTP POST Failure: Timeout Occurred".

Possible cause(s): a) the URL specified in the scenario customizing file points to a non-existent host or port (check that the URL is valid); b) the HTTP server specified in the URL is not running . . . start the HTTP server if it s not running . . . if the GRMG Application runs on the same server as the monitored components, then this error message also means that the tested components are no available.

2. Error Message: "Scenario Failure: No Response For Any Component in Request"

Possible cause: the GRMG application is responding without reporting on the state of any of the components requested to be monitored . . . check that the components specified in the GRMG customizing file match those checked by the GRMG application.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, hard disk drives, flash memory, optical disks, CD-ROMs, DVD ROMs, RAMs, EPROMs, EEPROMs, magnetic or optical cards or other type of machine-readable media suitable for storing electronic instructions. For example, the present invention may be downloaded as a computer program which may be transferred from a remote computer (e.g., a server) to a requesting computer (e.g., a client).

Throughout the foregoing description, for the purposes of explanation, numerous specific details were set forth in order to provide a thorough understanding of the invention. It will be apparent, however, to one skilled in the art that the invention may be practiced without some of these specific details.

Accordingly, the scope and spirit of the invention should be judged in terms of the claims which follow.

What is claimed is:

1. A method, comprising:

reading program code from memory and processing said program code with one or more processors to perform the following:

executing a testing scenario, said executing of said testing scenario including repeatedly receiving request messages from an entity over a network at a testing application on a server or servlet engine, said testing application being a software program that tests availability of other software programs and/or components, at least one of said software components including a login procedure for the at least one of said software components availability test, said request messages identifying a set of software components being: a) servable and/or invokable by said server or servlet engine; b) associated with said testing scenario; and, c) used by a same business logic process within an information system infrastructure, and, at least one of said request messages providing a respective user identification for the at least one software components including the login procedure for the at least one of said software components availability test; and, said executing of said testing scenario comprising, in response to each of said request messages:

said testing application testing said set of software components for availability and preparing and sending onto said network a response message to report, to the entity, availability or unavailability of said set of software components, said entity having sent said response message's corresponding request message.

2. The method of claim 1 wherein at least one of said one or more software components further comprises a web page and said web page's availability testing further comprises attempting to fetch said web page.

3. The method of claim 2 wherein said web page's Uniform Resource Locator (URL) is identified in each of said request messages.

4. The method of claim 1 further comprising creating, with a request message class, a request object from content of said response message's corresponding request message.

5. The method of claim 4 further comprising creating, with a scenario object class, a scenario object from said request object.

6. The method of claim 5 further comprising creating, with a response message class, a response message object for said response message.

7. The method of claim 1 wherein said response message is formatted as an XML document.

8. The method of claim 7 wherein each of said request messages is formatted as an XML document.

9. The method of claim 1 wherein said testing of said set of software components is performed by a servlet.

10. The method of claim 1 wherein the request messages are sent over the network to the testing application at a specified interval.

11. A computing system comprising:

one or more processors configured to perform operation comprising:

executing a testing scenario, said executing of said testing scenario including repeatedly receiving request messages from an entity over a network at a testing application on a server or servlet engine, said testing application being a software program that tests availability of other software programs and/or components, at least one of said software components including a login procedure for the at least one of said software components availability test, said request messages identifying a set of software components being: a) servable and/or invokable by said server or servlet engine; b) associated with said testing scenario; and, c) used by a same business logic process within an information system infrastructure, and, at least one of said request messages providing a respective user identification for the at least one software components including the login procedure for the at least one of said software components availability test; and, said executing of said testing scenario comprising, in response to each of said request messages:

said testing application testing said set of software components for availability and preparing and sending onto said network a response message to report, to the entity, availability or unavailability of said set of software components, said entity having sent said response message's corresponding request message.

12. The computing system of claim 11 wherein at least one of said one or more software components further comprises a web page and said web page's availability testing further comprises attempting to fetch said web page.

13. The computing system of claim 12 wherein said web page's Uniform Resource Locator (URL) is identified in each of said request messages.

14. The computing system of claim 11 further comprising creating, with a request message class, a request object from content of said response message s corresponding request message.

15. The computing system of claim 14 further comprising creating, with a scenario object class, a scenario object from said request object.

16. The computing system of claim 15 further comprising creating, with a response message class, a response message object for said response message.

17. The computing system of claim 11 wherein said response message is formatted as an XML document.

18. The computing system of claim 11 wherein each of said request messages is formatted as an XML document.

19. The computing system of claim 11 wherein said testing of said set of software components is performed by a servlet.

20. The computing system of claim 11 wherein the request messages are sent over the network to the testing application at a specified interval.

21. A machine readable medium storing instructions which when executed by one or more processors to perform a method, said method comprising:

executing a testing scenario, said executing of said testing scenario including repeatedly receiving request messages from an entity over a network at a testing application on a server or servlet engine, said testing application being a software program that tests availability of other software programs and/or components, at least one of said software components including a login procedure for the at least one of said software components availability test, said request messages identifying a set of software components being: a) servable and/or invokable by said server or servlet engine; b) associated with said testing scenario; and, c) used by a same business logic process within an information system infrastructure, and, at least one of said request messages providing a respective user identification for the at least one software components including the login procedure for the at least one of said software components availability test; and, said executing of said testing scenario comprising, in response to each of said request messages:

said testing application testing said set of software components for availability and preparing and sending onto said network a response message to report, to the entity, availability or unavailability of said set of software components, said entity having sent said response message's corresponding request message.

22. The machine readable medium of claim 21 wherein at least one of said one or more software components further comprises a web page and said web page's availability testing further comprises attempting to fetch said web page.

23. The machine readable medium of claim 22 wherein said web page's Uniform Resource Locator (URL) is identified in each of said request messages.

24. The machine readable medium of claim 21 further comprising creating, with a request message class, a request object from content of said response message's corresponding request message.

25. The machine readable medium of claim 24 further comprising creating, with a scenario object class, a scenario object from said request object.

26. The machine readable medium of claim 25 further comprising creating, with a response message class, a response message object for said response message.

27. The machine readable medium of claim 21 wherein said response message is formatted as an XML document.

28. The machine readable medium of claim 27 wherein each of said request messages is formatted as an XML document.

29. The machine readable medium of claim 21 wherein said testing of said set of software components is performed by a servlet.

30. The machine readable medium of claim 21 wherein the request messages are sent over the network to the testing application at a specified interval.

* * * * *